United States Patent Office 3,639,457
Patented Feb. 1, 1972

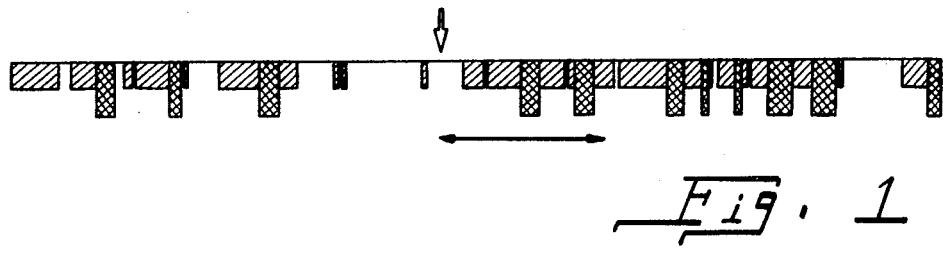
Fig. 1
Fig. 2
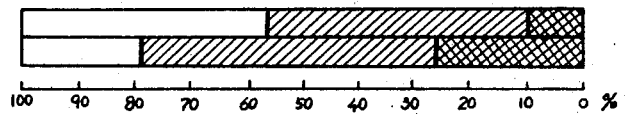
Fig. 3
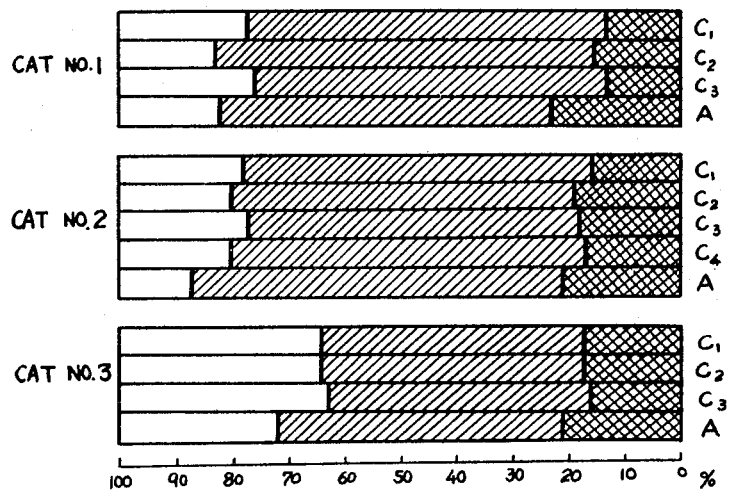

3,639,457
N-SUBSTITUTED-β-OXYBUTYRAMIDE SEMISUCCINATE AND ITS SALT HAVING EFFECTS OF INCREASING PARADOXICAL SLEEP AND TRANQUILLIZING
Akira Sakuma, 5–7 Zaimokuza, 6-chome, Kamakura-shi, Japan; Shizuo Torii, 16–18 Omori Nishi, 4-chome, Ota-ku, Tokyo, Japan; and Isamu Yanagisawa, 731 Otagaya, Tsurugashima-machi, Irima-gun, Japan
Filed Apr. 19, 1968, Ser. No. 722,749
Claims priority, application Japan, May 15, 1967, 42/30,710
Int. Cl. C07c 103/34
U.S. Cl. 260—485 J   5 Claims

ABSTRACT OF THE DISCLOSURE

N-substituted - β - oxybutyramide semisuccinate and its salt having effects of increasing paradoxical sleep and tranquillizing, and their utilizations.

---

This invention relates to novel chemical compounds having both effects of increasing paradoxical sleep and tranquillizing and, more particularly, to novel N-substituted-β-oxybutyramide semisuccinate having the following general formula

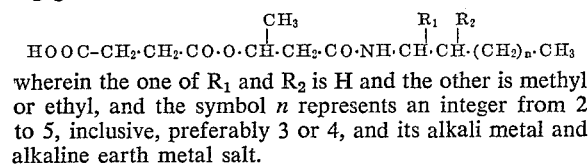

wherein the one of $R_1$ and $R_2$ is H and the other is methyl or ethyl, and the symbol $n$ represents an integer from 2 to 5, inclusive, preferably 3 or 4, and its alkali metal and alkaline earth metal salt.

The organic bromine compound evoking paradoxical sleep was isolated from the human cerebro-spinal fluid and identified as 1 - methylheptyl-γ-bromoacetoacetate by Dr. I. Yanagisawa, one of the present inventors. The compounds of this invention have been screened out from the numerous derivatives of 1-methylheptyl-γ-bromoacetoacetate according to the following steps. In the first place, the present inventors found that 1-methylhexyl-β-oxybutyrate, which was newly synthesized by the present inventors, has also the effect to provoke para-sleep. In the second, according to the idea of substituting the bridge oxygen of the ester of 1-methylhexyl-β-oxybutyrate for nitrogen, N-1-methylhexyl-β-oxybutyramide was synthesized. In the final place, the compounds of this invention were obtained as having the same radical of

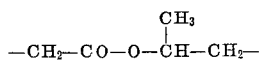

originally existing in the chemical structure of 1-methylhexyl-β-oxybutyrate.

As to the related substances of this invention, German Pat. No. 1,064,049 and British Pat. No. 871,252 report the analgesic effect of the amides of β-oxybutyric acid with primary amine having contiguous tertiary alkyl residue. German Pat. No. 964,057, No. 1,064,049, No. 1,-065,406, No. 1,068,692, No. 1,070,166, No. 1,087,025, No. 1,104,950, No. 1,136,714, British Pat. No. 871,252 and U.S.A. Pat. Nos. 2,941,002 and 3,051,618 report the analgesic or narcotic effect of the amides of β-oxybutyric acid with the amines having phenyl or cyclohexyl group or the semisuccinates of these β-oxybutyramides.

New compounds of the present invention evidence useful and unexpected pharmacological action in that they possess the favorable actions mentioned later. This is unobvious from the known art compounds of the above similar series.

Generally it is known that the effects of conventional hypnotics are narcotic and decrease the phase of paradoxical sleep and give abnormal encephalogram, and the state thereby brought about is essentially different from physiological sleep. Thus the compound having hypnotic activity which can produce the physiological sleep has been called for. From this point of view the hypnotic effect of the tranquillizers has recently been studied, instead of the classical sleep drugs. But this type of hypnotics have shown to have muscle relaxing activity on awakening and not to increase the phase of para-sleep.

The present invention is intended to provide new compounds which not only induce natural sleep without any narcotic effect but also actively augment the phase of para-sleep and have tranquillizing effect without muscle relaxation.

The present invention is also intended to provide compounds of medicinal efficiencies that are rapidly able to be absorbed from the gastrointestinal tract so that they have both immediate effect and security, and can be injected as a water-soluble form.

It is also an object of the present invention to provide a process by which these compounds with para-sleep augmenting effect that have never been observed in any conventional medicines can be easily and economically produced.

It is another object of the present invention to provide compounds which have these newly discovered effects at a small dose and almost no harmful side effects such as hemolysis, local irritation or gastrointestinal stimulation.

The compounds according to the present invention are synthesized in the usual way to produce the related substances. First such alkyl-amine of the general formula

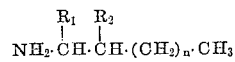

in which the $R_1$, $R_2$ and the symbol $n$ representation are the same as above, that is 1-methylhexylamine, 1-methylheptylamine, 2-ethylhexylamine, is reacted with diketene in such inactive solvent as benzene, and then N-substituted-acetoacetamide is obtained. Thus obtained compound is subjected to reduction with sodium boron hydride or catalytic reduction using Raney nickel, and N-substituted - β - oxybutyramide is obtained. This compound is then heated with succinic anhydride in pyridine or with succinic acid in inactive solvent added to such catalyst as sulfuric acid, and the corresponding objective N-substituted-β-oxybutyramide semisuccinate is obtained as crystal or oily substance. They can be converted into sodium salts, potassium salts, calcium salts or magnesium salts in the usual manner.

One of the compounds according to the invention, that is calcium N-2-ethylhexyl-β-oxybutyramide semisuccinate is available as white powder and its less hygroscopic property makes its pharmaceutical process easy. When preparing tablets or capsules there are added the carrier substances such as silicic acid, magnesium alumino silicate and lactose. Besides as it is water-soluble and the 5% water solution can be preserved stably at room temperature at least for six months, it is also available as a injection.

The effects of the compounds on sleep and wakefulness of cats are illustrated. FIG. 1 shows the sequence of the state of sleep and wakefulness determined by simultaneous recordings of the electroencephalogram, the electromyogram of the cervical muscle, and the eyeball-movement. (The sequence of the state of sleep and wakefulness before or after the oral administration of calcium N-2-ethylhexyl-β-oxybutyramide semisuccinate, 150 mg./kg. (indicated by arrow), in the cat.) FIGS. 2 and 3 show the time percentage change of the phases of sleep and wakefulness during 6 and 24 hours observation, respectively, i.e. FIG. 2 show the time percent and sleep and wakefulness before and after the administration of this compound in FIG. 1. FIG. 3 show the time percent of sleep and wakefulness during 24 hour observation in the cat. In the figure, the reference $C_1 \sim C_4$ designates the baseline observations carried out every 7th day; A designates the effect of 100 mg./kg. orally administered calcium N-2-ethylhexyl-β-oxybutyramide semisuccinate at the beginning of the observation.

One hundred milligrams or one hundred and fifty milligrams per kilogram of calcium 2-ethylhexyl-β-oxybutyramide semisuccinate, one of the compounds of the present invention was orally administered to cats and simultaneous recordings of the electroencephalogram, the electromyogram of the cervical muscle and the movement of eyeball revealed that both total sleep time and para-sleep time were significantly increased after administration of the compound.

In two trials during the period of 3 hours before and after the administration of 100 mg./kg. of this compound in a cat, the total sleep time was 40.5% and 44.1% (average 42.3%), and the para-sleep time was 8.9% and 7.8% (average 8.4%) before. After the administration, the total sleep time was 65.0% and 77.1% (average 71.1%) and the para-sleep time was 16.7% and 22.1% (average 19.4%). With 150 mg./kg. of the compound in the same cat, the total sleep time and the para-sleep time before the administration were 56.1% and 10.0% respectively and those after the administration were 78.3% and 26.1% respectively as shown in FIGS. 1-2. The difference between the para-sleep time before and after the administration in above trials is statistically significant ($P<0.01$) and also the difference between the total sleep time is significant ($P<0.05$).

When 30 mg./kg. of pentabarbital i.p. or 200 mg./kg. of bromvalerylurea orally was administered to the same cat, the phase of para-sleep is never found during the whole provoked sleep of 3 hours. When 3 mg./kg. of chlorpromazine was administered orally to the same cats, the total sleep time was 27.5% and the para-sleep time was 7.8%, and after the oral administration of 3 mg./kg. of nitrazepam, the total sleep time and the para-sleep was 28.5% and 5.6% respectively but severe staggering was observed for 2 days after awakening. Control recordings during the period of 3 hours were repeatedly taken with the same cat for six days and the average total sleep time was 44.9% (95% confidence limits: ±7.2) and the average para-sleep time was 7.4% (95% confidence limits: ±2.2).

Twenty-four hour-continuous observation tests were done by using the other three cats (FIG. 3). Three or four day-control tests before the administration revealed that the average total sleep time was 79%, 79% and 63% respectively about each cat, and the average para-sleep time was 14%, 18% and 17%. During the period of 24 hours after the oral administration of 100 mg./kg. of the present compound, the total sleep time was 82%, 87% and 72%, and the para-sleep time were 23%, 21% and 21% about each cat, respectively. The analysis of variance which was carried out with regard to cats and drug administration was statistically significant between the para-sleep time before and after the administration ($P<0.005$) and also between the total sleep time before and after it ($P<0.01$). The above results show that the present compound induces the natural sleep of cats, increasing both para-sleep time and total sleep time.

When calcium N-2-ethylhexyl-β-oxybutyramide semisuccinate was administered to mice, the righting reflex was lost and the $ED_{50}$ was 62.5 mg./kg. i.p. and 150 mg./kg. orally. The $ED_{50}$ to attain pharmacohypnosis in mice was 400 mg./kg. i.p. and 2,000 mg./kg. orally. The $LD_{50}$ for mice was 476 mg./kg. i.p. and 2,500 mg./kg. orally and so the coefficient of safety, i.e. the value of $LD_{50}$ for $ED_{50}$ of righting reflex loss, is extremely high. The dosage to attain pharmacohypnosis is about 80% of the $LD_{50}$ and this value corresponds, to that of the minor transquillizers. When mice were injected with this compound 100 mg./kg. i.p., their motions in a jingle-cage was clearly depressed. In a rotating-cage, their motions were less depressed. When 40 mg./kg. or 50 mg./kg. of thiopental was administered to mice 15 minutes after the administration of 100 mg./kg. i.p. of the present compound, the duration of pharmacohypnosis was prolonged about three times compared with administration of thiopental alone. Conditioned response (CR) which was afforded to mice by buzzers stimulus and electrical shocks was blocked in 50% of the mice after administration of this compound 100 mg./kg. i.p., although non conditioned response (NCR) was not blocked. This action was more remarkable than that of meprobamate. The fight of Betta splendens Regan (fighting fish) was depressed in water containing 250 p.p.m. of this compound. These results show that this compound belongs to the minor tranquillizer.

Calcium N-2-ethylhexyl-β-oxybutyramide semisuccinate was found to have the analgesic effect to mice and the $ED_{50}$ by the writhing method induced by acetic acid in mice was 121 mg./kg. i.p., and the potency was about ⅓ of that of aminopyrine.

The antagonism against pentetrazol 75 mg./kg. s.c. or strychinin 2 mg./kg. i.p. was not found after administration of this compound 100 mg./kg. i.p., The action of muscle relaxation in mice by the rotating rod method was not found after administration of this compound 100 mg./kg. i.p.

The rate of the inhibitory action on respiration of rat brain slice after administration of $1 \times 10^{-3}$ M of this compound was 27.8% at 5 mM. of potassium ion and 23.6% at 105 mM.

The subacute toxicity in rats has been tested over the period of 3 months by continuous daily administrations of the amount of each 1,000 mg., 400 mg. and 200 mg. of calcium N - 2 - ethylhexyl - β - oxybutyramide semisuccinate per kilogram orally, and each 250 mg., 100 mg. and 50 mg. of this compound per kilogram i.p. The result shows that this compound has no noticeable toxicity in the number of deaths, the rate of increase in bodyweight, the rate of taking food, the clinical chemical tests, the blood pictures and the microscopic tests of organ tissues.

In a pre clinical test on a few human males, the tranquillizing effect was noticeable in the dosage of 10~15 mg. of calcium N-2-ethylhexyl-β-oxybutyramide semisuccinate per 60 kilograms orally and the effect of inducing natural sleep was noticeable in the dosage of 45~60 mg. of this compound per 60 kilograms orally.

The invention is further illustrated by the following examples:

EXAMPLE 1

Calcium N-1-methylhexyl-β-oxybutyramide semisuccinate

To a solution of 13.2 grams of 1-methylhexylamine in 20 ml. of benzene, is added 9.6 g. of diketene in 20 ml. of benzene dropwise over a period of 30 min. at 40° C. After distillation of the solvent, the residue is dissolved in ether, washed successively with dilute hydrochloric acid, 2% sodium bicarbonate solution and water, dried with anhydrous sodium sulfate. After distilling off the ether, 20.3 g. of N-1-methylhexylacetoacetamide boiling at 139–141° C./1.6 mm. Hg is obtained. The product becomes to white crystal melting at 11° C. in ice box. IR $\lambda_{max}$ cm.$^{-1}$: 1730, 1650, 1560.

To a solution of 18.6 grams of N-1-methylhexylaceto-acetamide in 80 ml. of methanol, 3.6 g. of sodium boron hydride is slowly added at 40–45° C. After decomposition with dilute hydrochloric acid, the aqueous residue is extracted with ether. The ether extract is washed successively with 2% sodium bicarbonate solution and water, dried with anhydrous sodium sulfate and the ether is removed. By distillation under reduced pressure, 13.2 grams of N-1-methylhexyl-β-oxybutyramide boiling at 147–148° C./1.0 mm. Hg is obtained. After recrystallization from ethyl acetate, the product melts at 42° C. IR $\lambda_{max}$ cm.$^{-1}$: 1650, 1560.

To a solution of 10.5 grams of N-1-methylhexyl-β-oxybutyramide in 20 ml. of pyridine, 9.0 grams of succinic anhydride is added, and the mixture is heated at 105° for 20 minutes. After distilling the solvent, 60 ml. of water is added and extracted with ether, the ether layer is washed with 2% hydrochloric acid and then water and extracted with 50 ml. of 10% sodium bi-carbonate solution. The aqueous layer is separated, washed with ether, acidified with dilute hydrochloric acid to yield a yellowish oil. It is extracted with ether and the ether layer is dried with anhydrous sodium sulfate, decolorized by activated charcoal, to give a colorless viscous oil after removal of the solvent. The product is crystallized in ice box to give 10.4 grams of N-1-methylhexyl-β-oxybutyramide semisuccinate melting at 52° C. IR $\lambda_{max}$ cm.$^{-1}$: 1740, 1650, 1560. The amount of 0.05 N sodium hydroxide solution required to neutralize 60.3 mg. of this product: Calcd. for $C_{15}H_{29}O_5N$: 4.00 ml.; found 3.97 ml. The effect of sodium salt of this compound: $ED_{50}$ for righting reflex loss in mice: 125 mg./kg. This product affords a solution of the calcium salt by reacting with the calcd. amount of calcium hydroxide in water. After distilling the water off and drying under reduced pressure, it gives a white powder of the calcium salt $ED_{50}$ for righting reflex loss in mice: 150 mg./kg. orally.

EXAMPLE 2

N-1-methylheptyl-β-oxybutyramide semisuccinate 12.9 grams of 1-methylheptylamine is reacted with 8.4 grams of diketene and 19.6 g. of N-1-methylheptylaceto-acetamide boiling at 135–137° C./0.2 mm. Hg is obtained as crystal. After recrystallization from ethyl acetate, the product melts at 24° C. IR $\lambda_{max}$ cm.$^{-1}$: 3380, 1730, 1650, 1560.

To a solution of 10.0 grams of N-1-methylheptylaceto-acetamide in 40 ml. of methanol, 1.8 grams of sodium boron hydride is added, and the mixture is treated in the same way as in Example 1 and 8.9 grams of N-1-methylheptyl-β-oxybutyramide boiling at 149–151° C./0.3 mm. Hg is obtained as crystal. After recrystallization from ethyl acetate, the product melts at 65° C. IR $\lambda_{max}$ cm.$^{-1}$: 3340, 1640, 1560.

To a solution of 8.1 grams of N-1-methylheptyl-β-oxybutyramide in 20 ml. of pyridine, 8.0 grams of succinic anhydride is added, and the mixture is heated at 110° C. for 20 minutes. By the same way as Example 1, 6.8 grams of N-1-methylheptyl-β-oxybutyramide semisuccinate is obtained as crystal. Recrystallization from the mixture of ether and pet. ether affords the crystal melting at 55° C. IR $\lambda_{max}$ cm.$^{-1}$: 3390, 1745, 1720, 1660, 1570. The amount of 0.05 N sodium hydroxide solution required to neutrallize 65.3 mg. of this product: Calcd. for $C_{16}H_{29}O_5N$: 4.03 ml.; found: 4.02 ml. The effect of sodium salt of this compound in mice: $ED_{50}$ for righting reflex loss: 75 mg./kg. i.p.; 130 mg./kg. orally; $ED_{50}$ for pharmacohypnosis: 600 mg./kg. i.p., $LD_{50}$: 750 mg./kg. i.p.

EXAMPLE 3

Calcium N-2-ethylhexyl-β-oxybutyramide semisuccinate 12.0 grams of 2-ethylhexylamine is reacted with 7.8 grams of diketene, and 17.4 grams of N-2-ethylhexyl-acetoacetamide boiling 128–130° C./0.3 mm. Hg is obtained. IR $\lambda_{max}$ cm.$^{-1}$: 1730, 1650, 1560. A solution of 39.5 grams of N-2-ethylhexylacetoacetamide in 350 ml. of methanol is hydrogenated 18 hours at 75° C. in the presence of Raney nickel. After the catalyst is filtered off, the filtrate is freed from the solvent. By distillation under reduced pressure, 35.5 grams of N-2-ethylhexyl-β-oxybutyramide boiling at 149–150° C./0.30 mm. Hg is obtained as a colorless viscous oil. IR $\lambda_{max}$ cm.$^{-1}$: 3340, 1640, 1560, 1460.

*Analysis.*—Calcd.: for $C_{12}H_{25}O_2N$ (percent): C, 66.93; H, 11.70; N, 6.50. Found (percent): C, 66.91; H, 11.70; N, 6.62.

The product affords the p-nitrobenzoate by reacting with p-nitrobenzoylchloride in the presence of pyridine. Recrystallization from alcohol, the p-nitrobenzoate melts at 110° C.

*Analysis.*—Calcd. for $C_{19}H_{28}O_5N_2$ (percent): C, 62.62; H, 7.74; N, 7.69. Found (percent): C, 62.42; H, 7.68; N, 7.67.

To a solution of 180 grams of N-2-ethylhexyl-β-oxybutyramide in 300 ml. of pyridine, 150 grams of succinic anhydride is added, and the mixture is heated at 115° for 30 minutes. By the same way as Example 1, 245 grams of N-2-ethylhexyl-β-oxybutyramide semisuccinate is obtained as a colorless viscous oil. IR $\lambda_{mxa}$ cm.$^{-1}$: 1750, 1650, 1570.

*Analysis.*—Calcd. for $C_{16}H_{29}O_5N$ (percent): C, 60.93, H, 9.27; Found (percent): C, 60.73; H, 9.30.

The amount of 0.05 N sodium hydroxide solution required to neutralize 52.8 mg. of this product: Calcd. for $C_{16}H_{29}O_5N$: 3.35 ml.; found 3.35 ml.

To a solution of 125 grams of N-2-ethylhexyl-β-oxybutyramide semisuccinate in 750 ml. of 80% ethanol is added 15 grams of calcium hydroxide and shaken up for 15 minutes. Next, 600 ml. of anhydrous ethanol is added and the mixture is filtered off. After distilling off the alcohol from the filtrate, the residue is dried under reduced pressure and 130 grams of calcium N-2-ethylhexy-β-oxybutyramide semisuccinate is obtained in the form of white powder having a little hygroscopic property. IR $\lambda_{max}$ cm.$^{-1}$: 1740, 1650, 1570.

UV $\lambda_{max}^{H_2O}$ ($E_{1cm.}^{1\%}$):

192 (290).

*Analysis.*—Calcd. for $C_{32}H_{56}O_{10}N_2Ca$ (percent): C, 57.46; H, 8.40; Ca, 5.99. Found (percent): C, 57.03; H, 8.62; Ca, 6.04.

What we claim is:

1. N-substituted-β-oxybutyramide semisuccinate represented by the general formula

wherein the one of $R_2$ and $R_2$ is H and the other is methyl or ethyl, and the symbol $n$ represents an integer from 2 to 5, inclusive, and its sodium, potassium, calcium and magnesium salts.

2. N-2-ethylhexy-β-oxybutyramide semisuccinate represented by the structural formula

and its sodium, potassium, calcium and magnesium salts.

3. N-1-methylheptyl-β-oxybutyramide semisuccinate represented by the structural formula

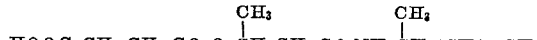

and its sodium, potassium, calcium and magnesium salts.

4. N-1-methylhexyl-β-oxybutyramide semisuccinate represented by the structural formula

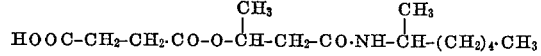

and its sodium, potassium, calcium and magnesium salts.

5. Calcium N-2-ethylhexyl-β-oxybutyramide semisuccinate represented by the structural formula
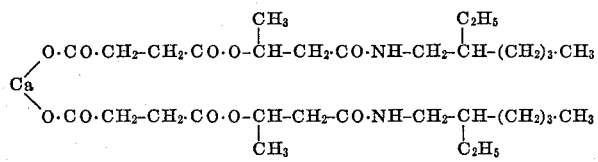
References Cited
UNITED STATES PATENTS
2,051,618   8/1962   Ehrhart et al. .......... 260—485
LORRAINE A. WEINBERGER, Primary Examiner
E. J. SKELLY, Assistant Examiner
U.S. Cl. X.R.
424—313